United States Patent [19]

Pielkenrood

[11] 4,144,173

[45] Mar. 13, 1979

[54] DEVICE FOR SKIMMING MATERIAL FLOATING ON A LIQUID

[75] Inventor: Jacob Pielkenrood, Krommenie, Netherlands

[73] Assignee: Pielkenrood-Vinitex B.V., Assendelft, Netherlands

[21] Appl. No.: 827,247

[22] Filed: Aug. 24, 1977

Related U.S. Application Data

[63] Continuation-in-part of Ser. No. 700,754, Jun. 29, 1976, abandoned.

[30] Foreign Application Priority Data

Jul. 1, 1975 [NL] Netherlands .................. 75/07791

[51] Int. Cl.² ............................................. B01D 21/18
[52] U.S. Cl. .................................................... 210/525
[58] Field of Search ................ 210/65, 221, 523, 524, 210/525, 526, 527

[56] References Cited

U.S. PATENT DOCUMENTS

| | | | |
|---|---|---|---|
| 1,098,812 | 6/1914 | Lowdon | 210/526 |
| 2,697,384 | 1/1954 | Clay et al. | 210/525 X |
| 2,713,026 | 7/1955 | Kelly et al. | 210/525 X |
| 2,880,876 | 4/1959 | Dujerdin | 210/525 |
| 3,286,844 | 11/1966 | Juell | 210/523 |
| 3,679,063 | 7/1072 | Pete | 210/526 |
| 3,756,418 | 9/1973 | Pantz et al. | 210/525 |
| 3,796,315 | 3/1974 | Chapman et al. | 210/523 |
| 3,872,005 | 3/1975 | Baher | 210/525 |
| 3,890,289 | 6/1975 | Johnson | 210/523 |

Primary Examiner—Theodore A. Granger
Attorney, Agent, or Firm—Smyth, Pavitt, Siegemund, Jones & Martella

[57] ABSTRACT

A device for discharging floating material from a supernatant layer floating on a carrier liquid in which the discharged material is moved along a discharge surface to an overflow. The device includes a carrier positioned above the supernatant layer. Blades are secured to the carrier for immersion in the supernatant layer in moving the layer toward the overflow. Means are further provided to move the carrier such that the blades supported by the carrier undergo movement through a trajectory with the trajectory of each blade or group of blades encompassing only a portion of the total displacement of the floating material by the movement of the carrier.

13 Claims, 15 Drawing Figures

DEVICE FOR SKIMMING MATERIAL FLOATING ON A LIQUID

This is a continuation-in-part of application Ser. No. 700,754 filed June 29, 1976 now abandoned, by the present inventor JACOB PIELKENROOD for "A DEVICE FOR DISCHARGING FLOATING MATTER FROM A SUPERNATANT LAYER", in which was claimed the benefit of Netherlands Patent Application No. 75/07791 filed July 1, 1975, the priority of which is claimed for common subject matter disclosed herein.

BACKGROUND OF THE INVENTION

When separating light components from a liquid suspension or the like, the separated particles will float on the liquid. The supernatant layer thus obtained can have different characteristics, in particular in respect of its stability and viscosity. This will, inter alia, depend on the character of the components and of the carrier liquid, the presence of air bubbles, etc.

It is sometimes possible to remove such a floating layer simply over a weir, but generally auxiliary means are required for removing this layer. To that end often scrapers are used which comprise a plurality of blades which can be circulated by means of endless cables or chains guided by rollers or sprockets, and this in such a manner that these blades are fully or partly immersed into the floating layer during a part of the cycle, and move substantially parallel to the liquid surface, so that the supernatant layer is displaced by these blades towards the discharge side of the separation device. At this discharge side an overflow weir is provided which generally extends above the liquid, but which, near the liquid surface, joins either gradually or angularly an inclined or curved surface along which the lower ends of the scraper blades are movable, so that the floating layer will be discharged by the circulating blades over the overflow. The shapes of this surface and of the trajectory of the scraper blades should be mutually adapted.

Such scrapers have disadvantages. It has appeared that such scrapers cannot fulfill their double task, viz., on the one hand, laterally displacing the floating layer and, on the other hand, shoving the supplied floating matter in an optimal manner over the overflow, in particular when modifications of the coherence, the composition and other characteristics of the floating layer occur. It has appeared that this layer, especially when the discharge falls behind the supply, can escape again for a substantial part below the blades. This will lead to undesirable disturbances of this layer which will unfavorably influence the separation effect and may even destroy it in a very considerable degree. If, on the other hand, the supply falls behind the discharge, it will be possible that near the discharge end, instead of the floating matter, also the underlying carrier liquid, insufficiently thickened floating matter or airy foam will be removed which is undesirable too, since it is, in fact, often desired to discharge the floating matter as concentrated as possible.

Broadly speaking, prior art devices for skimming a floating layer from the surface of a liquid can be classified into two main catagories, the first catagory is exemplified by: U.S. Pat. No. 3,635,349 issued Jan. 18, 1972 to Weiss et al.; U.S. Pat. No. 3,890,289 issued June 17, 1975 to Johnson; U.S. Pat. No. 3,756,418 issued Sept. 4, 1973 to Pentz et al.; and, U.S. Pat. No. 3,872,005 issued Mar. 18, 1975 to Baker.

The skimming devices in this first catagory are characterized in that they use a single blade for pushing the floating layer in a continuous motion toward the discharge weir.

Typically, the floating layer exhibits some resiliency or compressability, and as the floating layer is compressed between the single blade and the discharge weir it tends to escape by passing beneath the blade. If the blade is extended deeper into the liquid to prevent escape of the floating layer, excessive disturbance of the liquid will be caused, resulting in re-mixing of the already separated components, and liquid will be pushed over the weir.

The second catagory of prior art skimming devices is exemplified by: U.S. Pat. No. 3,286,844 issued Nov. 22, 1966 to Juell; U.S. Pat. No. 2,880,876 issued Apr. 7, 1959 to Dujardin; and, U.S. Pat. No. 2,697,384 issued Dec. 21, 1954 to Craig et al. The devices in this second catagory are characterized in that they employ a plurality of blades, instead of a single blade, affixed to a flexible endless belt. As the belt is driven, the blades are drawn across the surface of the liquid in a continuing succession. Although the use of a plurality of blades tends to relieve to some extent the problems encountered with single-blade devices, the skimmers in this second catagory generally tend to produce considerable splashing and disturbance of the floating layer as the blades enter the liquid, resulting in some re-mixing of the separated components. The disturbance is caused by the blade entering the liquid with a substantial forward velocity in most cases and at an angle with the liquid surface.

The structure of the present invention bears a superficial resemblance to features found in; U.S. Pat. No. 3,796,315 issued Mar. 12, 1974 to Chapman et al.; U.S. Pat. No. 3,966,592 issued June 29, 1976 to Herbert; and, U.S. Pat. No. 1,098,812 issued June 2, 1914 to Lowden. These patents disclose devices in which a rake with a plurality of blades is driven in a reciprocating raking motion.

These last three patents all relate to classifiers in which, as in known in the art, agitation is used to separate larger particles from smaller particles. In each case, the material being classified is intentionally agitated to produce the desired result, and in each case, the material classified is resting on an underlying surface, rather than floating on the upper surface of a liquid. Consequently, escape of the material beneath the blade is not a problem. Thus, the devices disclosed in these last three patents achieve a different result from the present invention and operate on a different principle. These patents do not teach or suggest the use of their devices for skimming a floating layer from a liquid.

SUMMARY OF THE INVENTION

The invention provides a device for removing separated components from a layer floating on a carrier liquid towards an overflow, the latter being provided with an upwardly inclined discharge surface submerged in the liquid, along which the floating components can be removed from the layer towards the overflow, which device comprises a movable carrier with blades or vanes or the like, which carrier is movable in such a manner that these blades follow a closed trajectory and are moved immersed into the liquid in the direction of the overflow, which device is characterized in that this carrier is constructed in such a manner that the closed trajectories of the individual blades only extend over a partial region of the total displacement path of the supernatant layer. In particular, the closed trajectory of an individual blade or group of blades is or can be adapted to the displacement requirements of the layer in the respective region. Furthermore, the driving means of the carrier are constructed in such a manner that immersion of the blades into the floating layer and preferably also retraction thereof from said layer takes place substantially in the longitudinal direction of the blades, and moreover, the trajectories of adjacent blades will preferably overlap each other.

In particular, the carrier comprises at least one first and one second part, the former covering mainly the region in the vicinity of the discharge surface and the latter the adjacent region of the supernatant layer, and possibly present further parts will cover adjacent regions of this layer.

For obtaining the desired trajectories of the blades several possibilities exist, comprising special crank drives, guiding assemblies, hydraulic or pneumatic driving means and the like.

As will be seen below, the present invention minimizes splashing and disturbance of the floating layer by inserting and removing the blades in a direction generally parallel to their longitudinal dimension. The reciprocating motion of the blades propels the floating material in a succession of interrupted stepping motions, permitting compression of the somewhat resilient floating layer to be periodically relieved, thereby preventing escape of the floating material beneath the blades.

BRIEF DESCRIPTION OF THE DRAWINGS

FIG. 9b is a plan view of the embodiment of FIG. 9a;

FIG. 9c is a set of diagrams showing the closed path of movement of the blades of the device of FIG. 9a;

DESCRIPTION OF THE PREFERRED EMBODIMENT

Figure 1:
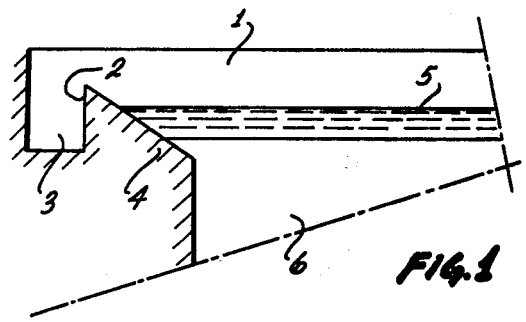
FIG. 1 is a fractional elevation view of the discharge portion of a separation device for floating components.

In FIG. 1 the upper part of a separation device is shown, comprising a flotation basin 1 provided, at one side, with an overflow 2, and at the other side of the latter a discharge duct 3 is present. This overflow 2 is joined by an inclined discharge surface 4 along which flotating components which float in a supernatant layer 5 on the carrier liquid 6 in the basin 1 can be removed over the overflow 2.

In such a continuously operating device the composition of the floating layer 5 is generally dependent on the thickness of this layer and on the distance to the overflow 2, which is mainly caused by the age of the floating layer. The usual discharge devices or scrapers generally comprise a set of endless chains or cables adapted to be driven substantially parallel to the floating layer on guiding rollers or the like, and to which blades or vanes are connected which, during a part of their trajectory, are immersed in the floating layer so as to move said layer towards the overflow 2. Since all the blades follow the same path, no difference is made between different layer regions with different characteristics. Moreover, the immersion of the blades into the floating layer and their removal therefrom takes place at a rather substantial change of direction which will have a disturbing effect on the characteristics of the floating layer in the region in question. If, as mentioned before, the discharge towards the overflow 2 is not adapted to the supply of floating matter towards or from the layer 5, either a part of the floating matter may escape below the blades which will lead to a serious disturbance of the separation process, or carrier liquid or insufficiently thickened or foamy matter will be dragged along towards the discharge 3.

It is an object of the invention to provide a discharge device for bringing about a displacement of the floating matter in such a manner that the disadvantages of the known devices are avoided, and this device is constructed so that the displacement of the floating matter can be adapted to the local displacement requirements and the floating layer characteristics.

Figure 2:
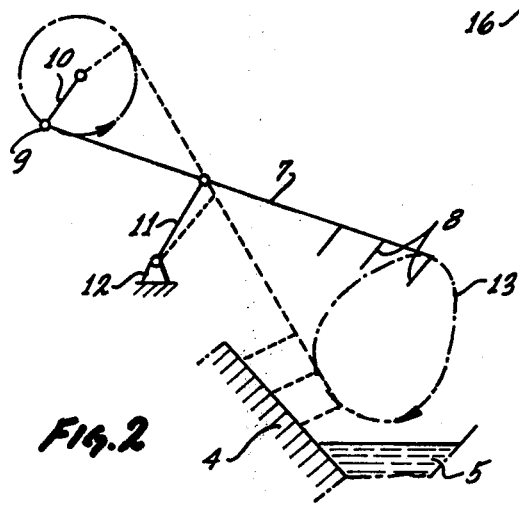
FIG. 2 is a diagram showing a simplified representation of the device of the invention as used for removing flotating components at the discharge portion of a separation device.

FIG. 2 shows a first embodiment of means for driving components from the layer 5 upwards along the inclined surface 4. These means comprise a frame 7 to which a plurality of blades 8 is connected. The free extremity 9 of this frame is pivotally connected to a crank drive 10, and between this extremity and the blades 8 the frame 7 is supported, e.g. at each lateral side, by an arm 11 which is pivotally connected to a fixed point 12. When the crank 10 is driven in the sense indicated by an arrow, the other extremity of the frame will follow the trajectory indicated at 13. From this it follows that the blades will be inserted substantially transversely to the surface of the layer 5 and will leave this layer again also transversely to its surface, and therebetween the blades will be moved substantially parallel to the surface 4. The different blades then describe substantially conformable trajectories which become smaller as the blade 8 in question is situated nearer to the pivot point. Dependent on the dimensions of the crank 10 and the arm 11 and on the mutual distance of the blades, these trajectories will more or less overlap.

In this manner, each blade 8 is inserted into the floating matter substantially in its longitudinal direction so that this blade will not undergo such a change of direction that the floating layer will be disturbed. Also retracting the blades from the floating layer takes place in this manner so that no floating matter will be slung away as is the case in the known devices. The different blades describe trajectories which only extend over a part of the displacement path of the floating matter, and during successive strokes each blade will contact at least a part of the matter which has been displaced by the adjacent blade during the preceding stroke.

Figure 3:
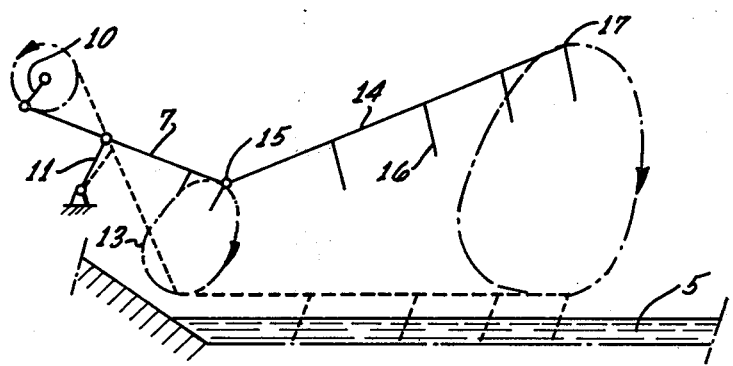
FIG. 3 is a diagram similar to FIG. 2 and showing additional means for removing the floating layer.

In FIG. 3 an embodiment is shown in which a second frame 14 is rigidly connected to the frame 7 of FIG. 2 at 15, which frame 14 is provided with blades 16. The free extremity 17 of the frame 14 will describe a curve which, again, is mainly similar to the curve 13 of FIG. 2 but is enclosing a larger area. The blades 16 are, again, inserted into the floating layer 5 in their longitudinal direction, and will subsequently move substantially in the direction of extension of this layer, after which the blades are again retracted from the floating layer substantially in their longitudinal direction. It is possible to use longer blades 16 near the free extremity 17 than near the connecting point 15 so as to obtain that all the blades will be inserted into the layer 5 substantially simultaneously.

Figure 4:
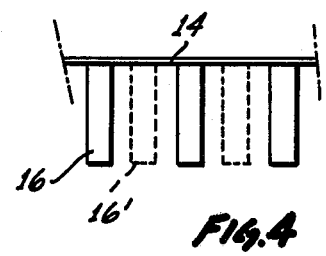
FIG. 4 is an end elevation view of the device of FIG. 3 showing the structure of the rake.

It has appeared that an effective discharge can be obtained by using blades which extend only over a part of the width of the basin 1 so that a more or less comb-shaped assembly is obtained as shown schematically in FIG. 4. In that case, narrow blades 16 are used which are arranged in rows with mutual interspaces, and the blades in alternating rows can be offset as schematically shown at 16'.

The floating layer 5 often shows a certain elastic coherence, e.g. in the case of a more or less foamy structure thereof, so that during displacement a certain compression in the surface direction can occur which may, for the rest, be dependent on the position in the floating layer in respect of the overflow 2, since the age of the layer, i.e., the preceding residence time of the floating components in the layer, is not the same everywhere, which age has an influence on the behavior of the layer. Since, now, the blades describe a trajectory extending only over a restricted part of the total layer extension, it can be obtained by a suitable positioning of the blades that the displacement in any partial region of the layer is adapted to the character of the layer in that region. To that end, the mutual distances between adjacent blades can be made different in the different parts of the carrier, and an example thereof is given in FIGS. 2 and 3. This distance distribution depends, of course, on the circumstances.

The embodiment of FIG. 3 can be modified by making the connecting point 15 pivotable and by connecting the extremity 17 to guiding means adapted to guide the frame 14 substantially parallel to itself. Such guiding means can, for instance, be constructed in the same manner as the crank assembly shown in FIG. 2.

Figure 5:
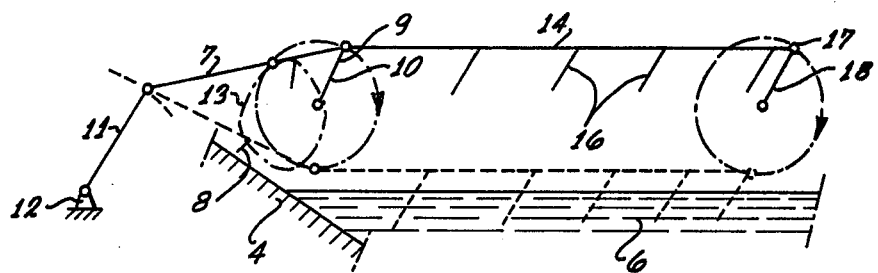
FIG. 5 is a diagram showing a simplified representation of an alternative embodiment of the device of the invention.

FIG. 5 shows still another embodiment which essentially corresponds to that of FIG. 2, but now the crank 10 and the arm 11 are positioned differently in respect of the frame 7. In that case, the frame 14 can be directly connected to the crank 10, and at the other extremity 17 a similar rotatable crank 18 can be used which, if required, can be driven together with the crank 10, and thus a parallel displacement of the frame 14 is obtained.

It will be clear that also guiding and driving means of another construction can be used for obtaining the desired displacement of the blades.

Figure 6:
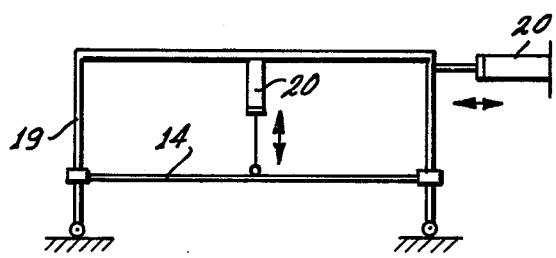
FIG. 6 is a side elevation view of a part of another embodiment of the device according to the invention.

FIG. 6 shows, in principle, a different embodiment in which frame 14 is vertically movable on guides 19, the latter being horizontally movable themselves, which movements can be brought about, for instance, by hydraulic or pneumatic cylinders 20 as is schematically indicated. Suitable control means, such as valves actuated by limit switches or the like, can be used then for having these cylinders operating in such a manner that the blades connected to the frame 14 will describe trajectories of the desired shape.

Figure 7:
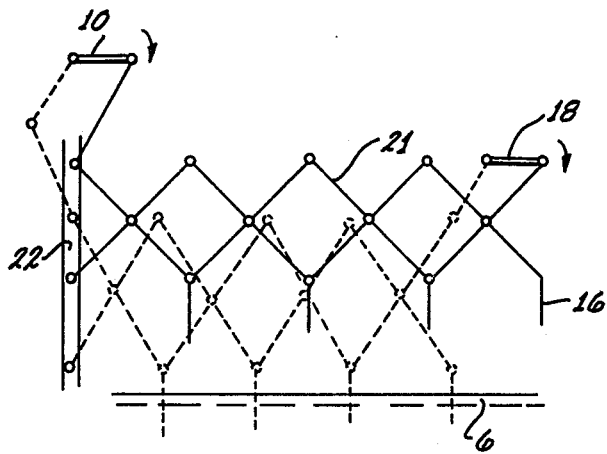
FIG. 7 is a diagram showing a simplified representation of a part of the device according to another embodiment of the invention.

As mentioned above, the displacement of the floating matter in the various regions of the floating layer can be adapted by a suitable choice of the mutual distances of the blades. It is, however, also possible to impart a different stroke length to the blades in the different regions of the floating layer. To that end, as schematically indicated in FIG. 7, use can be made of shears 21, one extremity thereof being supported in a vertical guide 22 and being adapted to be vertically moved, e.g. by means of the crank 10 of FIG. 5, the other extremity being driven by, for instance, the crank 18 of FIG. 5. It is also possible to mount similar shears on the frame 14 of the various embodiments described above in order to impart an additional movement to the blades apart from the proper movement of this frame. Moreover, the arms of the shears can have different lengths in different parts, in which case the differences in displacement between successive blades can be made still larger.

It will be clear that the different driving means can be modified in many ways. It will often be favorable to compress the floating layer slightly and to let it expand again during displacement, which may be effected by a suitable arrangement of the blades and, in particular, by means of the shear mechanism of FIG. 7. Furthermore, by suitably choosing the shape of the trajectories of the blades, it can be obtained that, when retracting these blades from the floating layer, the floating matter is slightly lifted and can slide off again along the blades, somewhat in the manner of a plow. It is also possible to arrange several frames side by side, which are individually driven with a certain phase difference, the blades of the different frames being, in particular, mutually offset.

Figure 8:
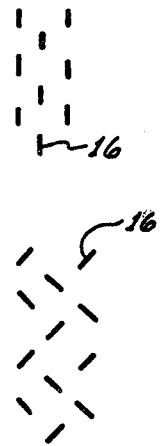
FIG. 8 is a diagram representing alternative arrangements of blades in the invention.

FIG. 8 shows top views of different manners of arranging the blades, and particularly in the case of blades with a different angular position, the mounting of the blades can be made adjustable so as to allow this angular position to be varied at will. In practice, it is possible to use relatively narrow and light blades and even pegs, so that it is practically feasible to use a frame in which these blades or pegs can be fixed, as needed, in the desired position and arrangement.

Figure 9A:
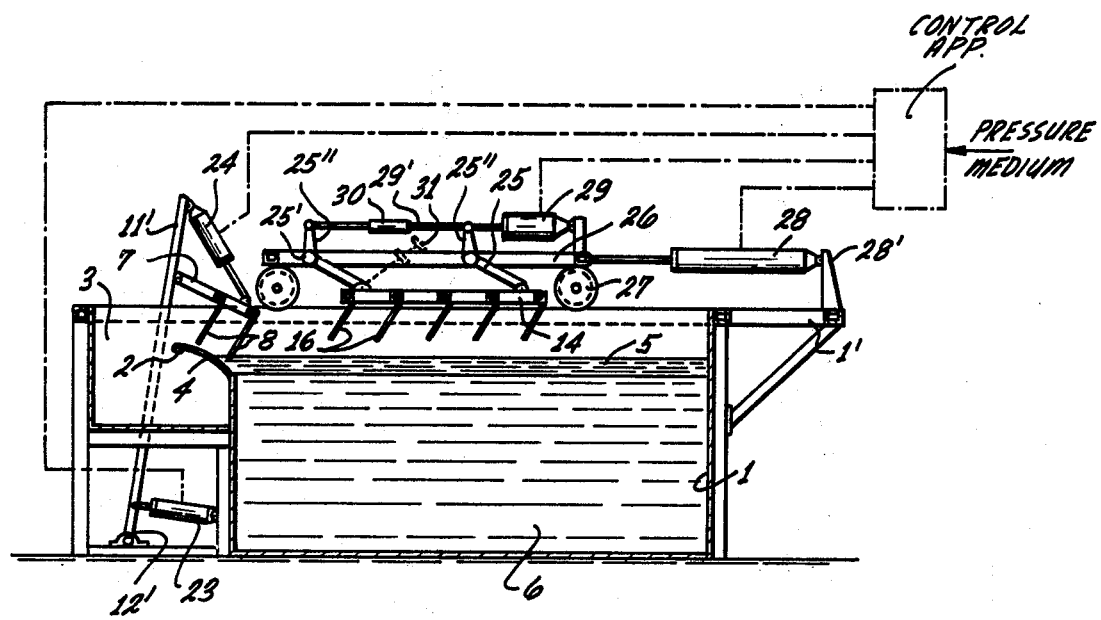
FIG. 9a is an elevation view of a preferred embodiment of the device according to the present invention.
Figure 9B:
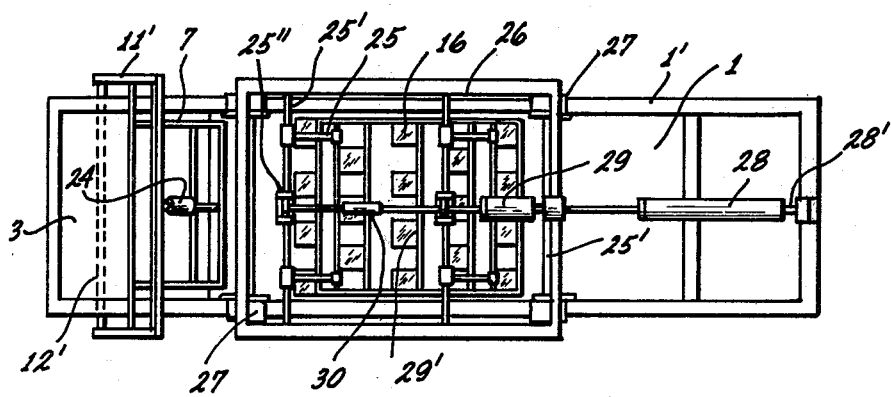
Figure 9C:
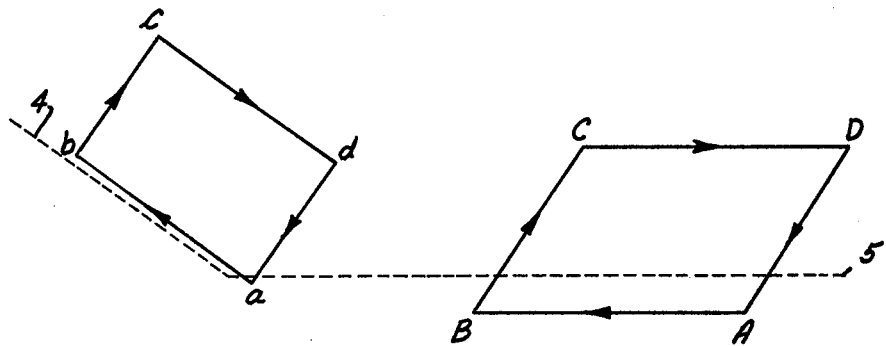
Figure 9D:
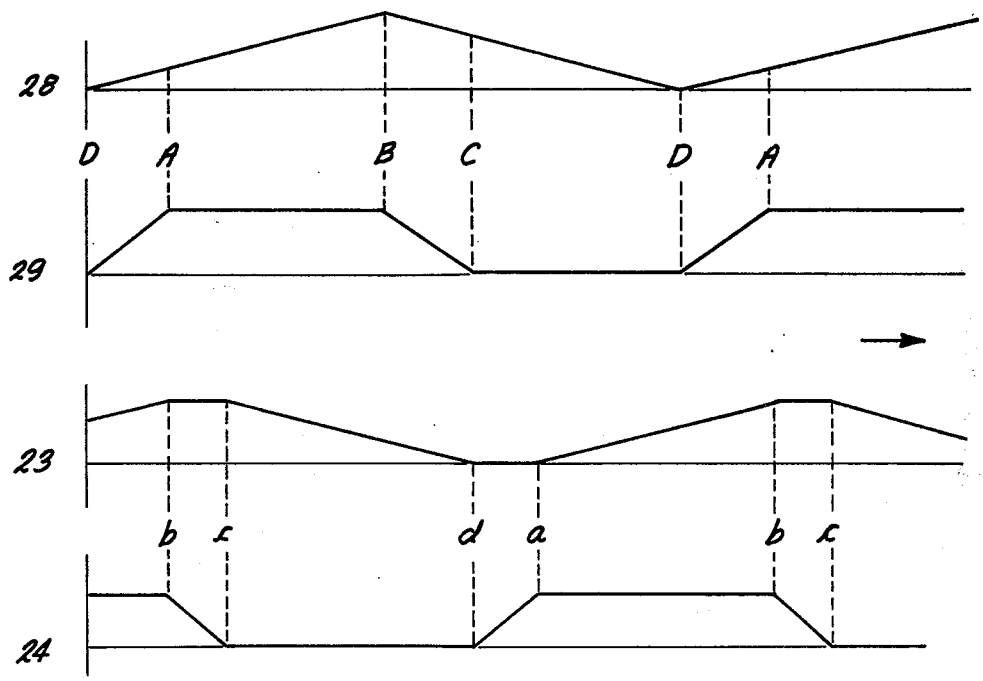
FIG. 9d is a set of timing diagrams showing the sequence in which the movements of FIG. 9c take place.

In FIGS. 9a and 9b a preferred embodiment and best mode of practicing the device of the invention is shown, which is based on the principles set forth above, in which the same reference numerals are used for indicating parts corresponding to those shown in the previous figures, and the operation thereof will be elucidated by reference to FIGS. 9c and 9d.

This practical embodiment comprises a substantially rectangular basin 1 reinforced by a frame-work comprising horizontal longitudinal upper beams 1'. At one extremity said basin communicates via an overflow weir 2 with a discharge chamber 3, said weir being the extreme edge of an inclined discharge surface 4 which serves for removing a supernatant layer 5 on the liquid to be cleaned 6 present in said basin. The liquid 6 is supplied near the bottom by supply means not shown, which liquid may contain flocculation agents promoting the separation of particles which are to be removed from the liquid. In particular means not shown may be present for introducing small air bubbles into the liquid body for making such particles more readily flotatable by adhesion of air bubbles, the separated particles then moving upwards towards the layer 5. Other means not shown are used for removing the clear liquid from below the layer 5.

The raking or skimming assembly of the invention shown comprises two main parts, the first one being used for removing the floating material along the surface 4 and the edge 2 into the chamber 3, and the second one being used for pushing the floating material towards said surface 4.

The first part of said assembly comprises a frame 7 carrying a plurality of blades 8, which frame is pivotally connected to an upright frame 11' supported on a fixed pivot axis 12'. The latter frame 11' can be swung to and fro by means of a driving cylinder 23, and frame 7 can be swung up and down by means of a cylinder 24 connected to frame 11' as shown. Preferably the surface 4 is a part of a cylindrical surface having an axis coinciding with the pivot axis 12' so that the free ends of the blades 8, when frame 7 is in its lowest position, can move along or at the small distance from the surface 4.

The second part of said assembly comprises a frame 14 with blades 16, which may be arranged in the mutually offset manner shown in FIGS. 9b, 4 and 8. This frame is suspended by means of two pairs of oscillating arms 25 mounted on shafts 25' supported on a suspension frame or carriage 26 which is horizontally movable by means of wheels 27 bearing on the respective upper beams 1'. Instead thereof the wheels 27 may be fixed to the upper beams 1' and co-operate with rails on frame 26.

Frame 26 is connected to a driving cylinder 28, one end of which being fixed at 28' to the reinforcing frame of the basin 1, so that frame 26 can be moved to and fro by actuating this cylinder 28. The carriage 26 is provided with a second cylinder 29, the piston rod 29' of which is coupled to cranks 25" on the shafts 25' of the arms 25. The part of said rod 29' between both cranks 25" is provided with an element 30 for adjusting the length of said intermediate part, which element is, for instance, a nut with left-hand and right-hand screw-thread cooperating with corresponding screw-thread on the adjacent parts of the rod 29'. By adjusting this element 30 the angle between both pairs of arms 25 can be varied, and thus the inclination of frame 14 in respect of the liquid surface, which determines which blades 16 will contact the liquid first.

As indicated by interrupted lines, the cylinders 23, 24, 28 and 29 are connected to a source of pressure medium (not shown) by means of a control apparatus. The pressure medium may be a liquid or a gas, but in practice compressed air is preferred since pneumatic driving and control means are very suitable for operating under unfavorable environmental conditions and require only little maintenance. The control apparatus can be of any known type which is suitable for providing the required operation cycles. In the case of pneumatic means the control apparatus may comprise a rotating cam shaft actuating air valves controlling the air supply towards the individual cylinder halves, but the device of FIG. 9a can also be made self-controlling by using end-of-track switches or valves co-operating with the reciprocating frames. Moreover, adjustable stop means, such as schematically indicated at 31 in FIG. 9a, may be provided for limiting the penetration depth of the blades 14 into layer 5, which depth may also be controlled by the control apparatus or by adjustable end switches or the like.

FIGS. 9c and 9d show diagrams illustrating the operation of the device of FIGS. 9a and 9b. The quadrangles abcd and ABCD each represent the trajectory of the tip of one of the blades 8 and 16 respectively, and the arrows indicate the sense of movement. The sides da and DA are substantially parallel to the direction of the blades 8 and 16 respectively, so that the blades will be inserted into the floating material in the direction of their extension, which will cause the least possible disturbance of the layer 5. The sides bc and BC are, in the case shown, parallel to the sides da and DA respectively, so that the blades will be retracted from said layer in the same direction, and splashing will be avoided. However, the retraction angle is not very critical as long as splashing is sufficiently avoided. The sides ab and AB are substantially parallel to the surface 4 and the surface of the layer 5 respectively. The sides cd and CD are shown as being parallel to ab and AB respectively, but this is not required.

FIG. 9d shows a timing diagram of the operation of the driving cylinders 28, 29 and 23, 24 for obtaining the trajectories of FIG. 9c. The co-ordination of the movements of frames 7 and 14 is such that the floating material pushed forward by the blades 16 is raked upwards along the surface 4 by the blades 8 after the blades 14 are retracted from the layer 5 and are moved sufficiently towards the right for providing space for the blades 8. This co-ordination can be obtained by means of a central control device adapted to program the cycles in question, but it is also possible to obtain this co-ordination by means of end switches. These switches can be adjustable so as to vary the shape of the trajectories in question, and moreover, adjustable throttle means may be included for varying the speed of operation of the cylinders, which also permits the slope of the inclined parts of the trajectory to be altered.

If pneumatic cylinders are used, return lines for the pressure medium are not necessary, since the air discharged from a cylinder can escape into the ambient air. The trajectories shown in FIG. 9c are exemplary and can be varied at will in accordance with the requirements.

If an independent phasing of the movement of frame 7 is not required, it is possible to connect its free end by means of pivots to the near end of frame 14.

Figure 10:
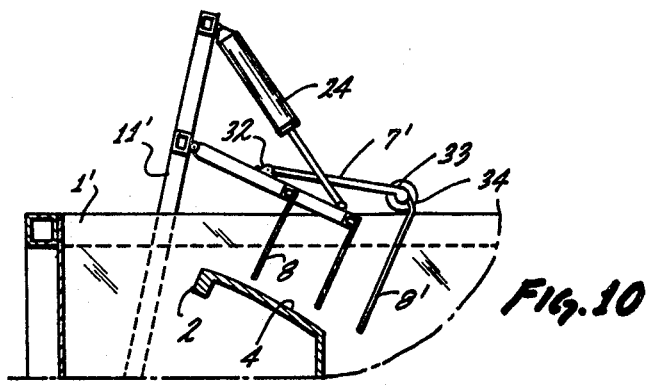
FIG. 10 is an elevation view of another embodiment of a portion of the device according to the present invention.

FIG. 10 shows a special embodiment of the support means for said first set of blades 8' which describes a trajectory which is at least partly covering a region adjacent to the discharge surface 4. In order to prevent that these blades 8' will penetrate too deeply into the layer 5 and will, in particular, take along also liquid 6 or foamy matter from below the layer 5, this first set of blades 8' is mounted on an auxiliary frame 7' which is connected to the frame 7 by means of a pivot 32, and at its other extremity 33 is guided by a guiding means schematically indicated at 34, which prevents the blades 8' from being immersed too deeply into the layer 5, and a stop 35 on the frame 7 will lift the auxiliary frame 7' at the end of its movement towards the surface 4.

Figure 11B:
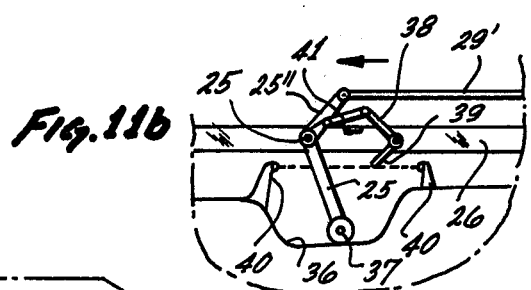
FIG. 11a is a side elevation view of another embodiment of the present invention; and, FIG. 11b is a fractional side elevation view of the embodiment of FIG. 11a showing a different stage in the operation of the toggle mechanism.
Figure 11A:
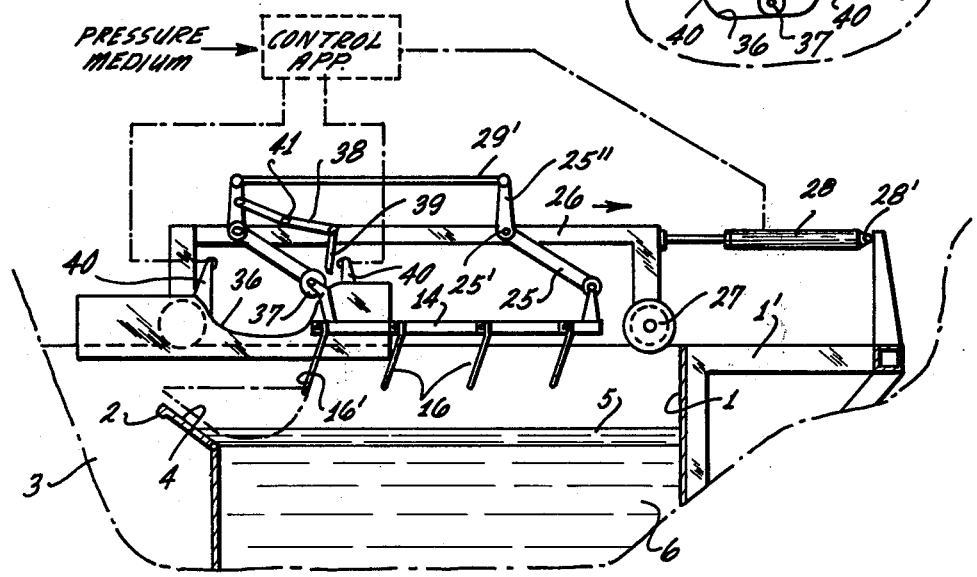

FIGS. 11a and 11b show a simplified embodiment of the device of FIG. 9a in which the carriage 26 driven by the cylinder 28 is used again, but the upward and downward movement of the arms 25 is now mechanically derived from the horizontal movement of the carriage 26. This embodiment has proved to be particularly suited for smaller installations. In the embodiment shown, a guiding surface 36 is used which co-operates with a follower 37 connected to an arm 25. Near the end of the forward stroke (i.e. to the left in FIG. 11), the frame 14 is lifted as the follower 37 is moved along the left-hand rising part of the guiding surface 36, and then the extreme left-hand blade 16' (or group of juxtaposed blades) will be moved so that its lower edge will scrape along the inclined surface 4 for removing a part of the floating material over the weir 2. This first blade 16' takes over the task of the blades 8 in the embodiment of FIG. 9a which leads to a substantial simplification, not only because of the reduction of the number of movable parts, but also since the control apparatus will be considerably simplified, in particular since there is no need for means for co-ordinating the movements of independently moving frames. The whole control apparatus can be reduced to one pair of end-of-track switches actuated by the carriage 26.

Although it is possible to use guiding means adapted to keep the frame 14 in its upper position during its return stroke (i.e. to the right in FIG. 11a), it is preferred to use locking means keeping this frame in its upper position until being unlocked again at the end of the return stroke.

FIGS. 11a and 11b, an embodiment of such locking means is shown during the return and forward strokes respectively. These means comprise a toggle lever 38 with a finger 39 and end stops 40. As shown in FIG. 11b, the toggle 38 is collapsed during the forward (leftward) movement so that follower 36 can follow the lower part of the guiding surface 36. As the frame 14 is lifted by follower 37, the toggle 38 is stretched, and at the end of the lifting movement finger 39 is given a final push when hitting the left-hand stop 40, so that the toggle is moved overcenter as shown in FIG. 11a, which position is maintained since the central pivot of the toggle is retained by a stop 41, e.g. a part of the carriage frame 26 itself. The left-hand stop 40 may be omitted if the toggle will be rotated sufficiently by gravity or by means of a spring. At the end of the return stroke the toggle will be collapsed again by the right-hand stop 40 when contacting the finger 39.

The stops 40 may also be parts of switching means used for initiating the reversing of the sense of movement of cylinder 28, as schematically indicated in FIG. 11a. It will be clear that also in the embodiment of FIG. 9a such guiding surfaces and associated parts may be used instead of the driving cylinders 24 and 29.

In certain circumstances the principle of the invention can already be realized by means of blades supported by endless cables or chains, if only the trajectories of these blades cover only a part of the displacement path of the floating components so as to allow an adaptation to local requirements. In particular, such a simplified device comprises two sets of blades supported and driven by cables or chains, one set being used for laterally displacing the floating matter, and the other set for discharging this matter over the overflow, and instead of the latter set also the device of FIG. 2 can be used.

An important advantage of the embodiments shown is that the floating layer which is slightly compressed by inertia when being pushed forward towards the inclined surface 4 during the forward stroke of the blades, can expand again during the rearward stroke of said blades, so that the compression cannot build up to such an extent that floating matter would escape below the blades and would, then, be remixed with the underlying liquid. The trajectories of the blades can be made so that the least possible disturbance of the floating layer will take place when introducing the blades into said layer and no substantial splashing will occur when retracting the blades from said layer.

I claim:

1. A raking device for discharging floating material supernatant on a liquid contained in a basin by pushing the floating material along the surface of the liquid toward an overflow weir connected to one end wall, said raking device comprising in combination:
 a basin having side walls and end walls, the upper portions of said walls extending above the supernatant layer, said basin further having a weir including an inclined surface extending into the supernatant layer;
 a first frame positioned between the upper portions of the side walls;
 a plurality of blades attached to said first frame and spaced in the direction of pushing toward the weir to form a first rake assembly, each blade having a pushing surface extending substantially transversely to said frame;
 first suspension means connecting said first frame to walls of said basin for movement with respect to said basin in a first direction substantially parallel to the pushing direction, and in a second direction substantially transversely to said first direction;
 first driving means connected to said frame to reciprocate it in the first direction, the stroke length of the reciprocating movement being a fraction of the length of said basin in the first direction, and to reciprocate said first frame in the second direction between a first position and a second position which are vertically spaced so that the blades, in the first position, extend into said supernatant layer, and, in the second position, are completely retracted from said supernatant layer, the reciprocating movements in said first direction and said second direction being correlated by said first driving means so that each blade describes a closed-loop trajectory, moving from the second position to the first position in a direction substantially parallel to the pushing surface of each blade and moving substantially parallel to said supernatant layer while in the first position, the trajectories of the different blades being staggered in the first direction.

2. The raking device of claim 1 further comprising:
 carrier means driven by said first driving means in the first direction with respect to said basin, said suspension means interconnecting said first frame and said carrier means so as to guide the movement of said first frame in the second direction relative to said carrier means.

3. The raking device of claim 2, in which said first suspension means further comprise:
 at least two pairs of guiding arms which are pivotally connected to said first frame and to said carrier means, the arms of each pair being separated from one another in the first direction.

4. The raking device of claim 2 wherein said first driving means further comprise:

first cylinder means connected to said carrier means for reciprocating it in the first direction;

second cylinder means connected to said carrier means and to said first frame for reciprocating said first frame relative to said carrier means;

a source of driving medium connected to said first cylinder means and said second cylinder means for applying to them a controlled flow of the driving medium; and, control means associated with said first cylinder means with said second cylinder means and with said source of driving medium, and controlling the flow of the driving medium to said first and second cylinder means so as to produce a coordinated succession of movements of said first frame in the first and second directions causing each blade to describe the closed-loop trajectory.

5. The raking device of claim 2 wherein said driving means further comprise:

first reciprocating means for reciprocating said carrier means in the first direction;

guiding means fixed to said basin; and, follower means connected to said first frame and cooperating with said guiding means during motion of said carrier means in the first direction to produce a reciprocating movement of said first frame in the second direction coordinated with the movement of said carrier means in the first direction.

6. The raking device of claim 1, wherein said first frame is movable in the first direction so that the trajectory of at least the extreme blade nearest to the overflow weir sweeps over a portion of the inclined surface of said weir, and wherein the correlation of the movements in the first and second directions provided by said first driving means is such that the movement of said first frame in the second direction is started near the end of the movement of said first frame in the first direction towards the overflow weir so as to guide the free extremity of at least said extreme blade substantially parallel to the inclined surface of said weir.

7. The raking device of claim 1 further comprising:

a second rake assembly including a second frame and at least one blade, and being spaced from said first rake assembly in the first direction;

second suspension means connecting said second frame to said basin walls to position said second frame generally above the inclined surface of said overflow weir, and allowing said second frame to be moved in a third direction substantially parallel to said inclined surface, and in a fourth direction substantially transversely to the third direction, second driving means connected to said second frame to reciprocate it in the third direction, and also to reciprocate it in the fourth direction between a third position and a fourth position which are vertically spaced so that, in the third position, the free extremity of each blade is kept at a small distance from said inclined surface while extending into a part of the supernatant layer being pushed along said inclined surface over said weir, and so that, in the fourth position, the free extremity of each blade is retracted from said layer, said third and fourth reciprocating movements being correlated by said second driving means so that each blade describes a closed-loop trajectory, the movement from the fourth position to the third position being substantially parallel to the pushing surface of each blade, and the operation of said second driving means being correlated with the operation of said first driving means in such a manner that the part of the supernatant layer being pushed onward by the blades of said first frame is taken over by the blades of said second frame so as to be pushed over the weir.

8. The raking device of claim 7 wherein said second driving means further comprise a drive crank connected to said second frame for driving said second rake assembly in a reciprocating motion in the fourth direction.

9. The raking device of claim 7, wherein said first and said second frames are interconnected at their adjacent ends.

10. The raking device of claim 7, further comprising:

an upright guiding frame, a first pivot means connecting said guiding frame to the basin for movement substantially in the third direction; and, second pivot means connecting said second frame to said guiding frame for movement of said second frame in the fourth direction.

11. The raking device of claim 10, wherein said second driving means further comprise third cylinder means for moving said guiding frame with respect to the basin, and fourth cylinder means for moving said second frame with respect to said guiding frame.

12. The raking device of claim 1 wherein said first driving means further comprise a drive crank connected to said first frame for driving said first rake assembly in a reciprocating motion in the second direction.

13. The device of claim 1, in which said first suspension means further comprise a guiding bar assembly including a plurality of bars pivotally interconnected to form a multiple shear, the blades being connected to pivot points along one side of said multiple shear.

* * * * *